Patented Apr. 20, 1954

2,676,169

UNITED STATES PATENT OFFICE 2,676,169

METHOD OF TREATING ZEIN

Bernard Baldoni, Pekin, Ill., assignor to Corn Products Refining Company, New York, N. Y., a corporation of New Jersey No Drawing. Application September 26, 1951, Serial No. 248,459

5 Claims. (Cl. 260—123)

This invention relates to an improved method of recovering zein from dispersions or solutions thereof. More particularly it relates to a method of treating such solutions or dispersions whereby recovery and drying of the zein are facilitated.

Zein is the fraction of the protein contained in corn (maize) which is soluble in certain concentrations of alcohol. Commercially it is prepared by extracting corn (maize) gluten with 60 to 80 per cent isopropyl alcohol under alkaline conditions. After neutralization and concentration, the extract containing the zein is sprayed into cold water whereupon the zein precipitates. The temperature of the water should be low enough to permit the zein to harden (55–60° F.). Aging the suspension after precipitation, i. e. allowing the suspension to stand or agitating it for a suitable period of time to leach out the alcohol from the precipitated zein, aids filtration. The precipitated zein is separated by filtration and dried. U. S. Patents Nos. 2,156,928; 2,221,560; 2,221,561; 2,238,591; 2,227,488; 2,287,649; and 2,332,356 describe several methods of obtaining zein from corn gluten.

The zein precipitated in cold water, as above described, cannot be freed readily of water as by filtration. It is not possible to squeeze water out of wet zein because of the tendency of wet zein to gum or soften under very slight pressure or moderately high temperatures. Thus, the zein filter cake from a vacuum filter retains about 80 per cent moisture. Such high moisture content involves the expenditure of large amounts of heat for drying. Furthermore, there is danger that the zein will be denatured during the more prolonged drying operation. Obviously, it would be desirable to reduce the moisture content of the zein so that it may be readily filtered and dried.

It is an object of this invention to provide an improved method for recovering zein from solutions or dispersions thereof. A further object is to provide a method for conditioning zein in aqueous or essentially aqueous suspension so that it may be readily filtered and dried without impairing its various physical and chemical properties. A further object is to provide an improved method for afterwards reducing the amount of moisture retained in zein which has been precipitated from solution by cold water. A further object is to reduce the time required to filter zein precipitated from solution by cold water. Other objects will appear hereinafter.

In carrying out my invention, a solution, e. g., isopropyl alcohol solution or dispersion of zein, is sprayed into cold water in the customary manner to precipitate the zein. Thereafter, the resultant suspension containing the freshly precipitated zein is aged in customary manner and then heated under controlled conditions, then cooled to a predetermined temperature level and the zein separated, as by filtration. Alternately, and preferably for simplification of alcohol recovery the leaching is carried out in more than one step, i. e. the precipitated zein is separated from the suspension, reslurried in fresh water, the zein slurry heated under controlled conditions and then cooled to a predetermined temperature level and the zein again separated. The separated zein may then be dried in conventional driers in conventional manner.

It is believed that the aforementioned treatment causes the zein particles to shrink thereby forcing the water out of the particles and also causes some agglomeration of the particles, the latter phenomenon resulting in easier filtration.

The temperature most effective for producing the observed dewatering and partial agglomeration of the particles of zein should be above the softening point and appears to be dependent upon the alcohol concentration within the particles. Such alcohol concentration varies with the alcohol concentration within the suspension or slurry and the time during which leaching after precipitation has progressed. Thus, freshly precipitated zein in 5 per cent isopropyl alcohol is sticky and difficult to handle even at 55° F. It is preferred to allow some aging in this state, low temperature filtration and reslurrying in fresh water before carrying out the mild heat treatment proposed. However, if further leaching time is permitted, or if a second filtration and reslurrying is performed, higher treating temperatures will be feasible and gumming tendency is reduced so that higher temperatures can be used for filtration.

When the aforementioned zein suspension containing freshly precipitated and aged zein is heated, the temperature of the suspension should not exceed about 100° F. since the zein may be denatured at higher temperatures. After the suspension has been heated to 100° F., it may be cooled and filtered immediately to produce satisfactory results. However, if the temperature of the suspension is maintained at 100° F. for 15 minutes better results are obtained. The zein suspension may be maintained at any temperature up to 100° F. for 15 minutes, about 85° F. for as long as one hour, or up to 3 hours at 66° F. and then cooled and filtered. Longer holding times are permissible at the lower temperatures but should be avoided at the higher temperatures. The longer the holding time, providing denaturation is avoided, the lower will be the moisture content of the zein filter cake.

If the zein after separation from the original zein suspension is reslurried in water, the temperature of the slurry may be maintained at any temperature up to about 110° F. for as long as one hour and then cooled or the suspension may be cooled and filtered immediately. Again the longer the holding time, providing denaturation is avoided, the lower will be the moisture content of the zein filter cake. Longer holding times than one hour are permissible at lower temperatures but are not advantageous.

Heating may be effected by various conventional means e. g., addition of hot water or steam or external heating. Preferably the suspension should be agitated during heating to avoid formation of large lumps of zein.

The temperature to which the zein suspension containing freshly precipitated zein should be cooled before filtration may be about 32° F. to about 65° F. The temperature to which the slurry containing the reslurried zein should be cooled may vary from about 55° F. to about 77° F.

The solids concentration during the heat treatment is not critical as long as the suspension, or slurry is free flowing and can be handled with a conventional type of pump.

The following examples, which are intended as informative and typical and not in a limiting sense, will further illustrate the invention.

EXAMPLE I

An 80 per cent isopropyl alcohol extract of corn gluten containing about 25 g. of zein per 100 ml. of extract was sprayed into cold water (55 to 60° F.) to precipitate the zein. The zein was filtered and the zein cake containing 80 per cent moisture reslurried in water at the rate of 4 parts of zein (dry basis) to 100 parts of water. Thereafter 8 ounce samples of the resultant slurry were heated, in glass bottles, in a water bath, at various temperatures and for various periods of time, and thereafter filtered. The samples were then cooled and filtered on a Buchner funnel using nylon cloth (No. 5028) as a cake support and a vacuum of 25 inches. Filtration rates were determined by the number of seconds required for a cake to form on the filter.

The results of the tests are shown in Table I.

Table I
TEMPERATURE OF SLURRY

| Holding Time, Minutes | 55° F. (Control) | | 70° F. | | 80° F. | | 90° F. | |
|---|---|---|---|---|---|---|---|---|
| | Cake Moist., Percent | Filt. Rate, Secs. | Cake Moist., Percent | Filt. Rate, Secs. | Cake Moist., Percent | Filt. Rate, Secs. | Cake Moist., Percent | Filt. Rate, Secs. |
| 0 | 76.0 | 40 | 74.3 | 40 | 70.3 | 33 | 61.3 | 12 |
| 5 | | | 70.8 | 32 | 52.3 | 7 | 50.8 | 2 |
| 15 | | | 70.3 | 20 | 45.6 | 4 | 49.5 | 2 |
| 30 | | | 66.1 | 15 | 44.8 | 3 | [1] 49.5 | 2 |
| 60 | | | 62.5 | 15 | 42.3 | 3 | [1] 47.5 | 2 |

[1] Zein cake showed evidence of complete agglomeration and it was difficult to break up the cake.

EXAMPLE II

Samples of a zein slurry obtained, as in Example I, were heated by adding hot water thereto in the ratio of one volume of hot water to 2 volumes of slurry. The temperature of the original slurry was 55° F. After the addition of the hot water, the samples were held for 1.5 minutes, cooled to 55° F. and filtered, as in Example I.

The results of the tests are shown in Table II.

Table II

| Temperature of Water Added, ° F. | Final Temperature of Slurry, ° F. | Moisture Content of Cake |
|---|---|---|
| 120 | 77 | 65.4 |
| 130 | 80 | 62.5 |
| 150 | 87 | 60.9 |
| 170 | 93 | 55.9 |
| 180 | 96 | 54.0 |

EXAMPLE III

An isopropyl alcohol extract of corn gluten was sprayed into cold water, as in Example I. The zein which precipitated was filtered and reslurried in water at 55° F. at the rate of 4 g. of zein (dry basis) to 100 ml. of slurry. Thereafter 8 ounce samples of the slurry were heated in glass bottles in a steam bath to various temperatures. As soon as the desired temperature was reached the slurries were cooled to 55° F. and filtered on a Buchner funnel, as in Example I. The vacuum was continued for 2.5 minutes after the cake had formed. The results are shown in Table III.

Table III

| Temperature of Slurry, ° F. | Temperature of Filtration, ° F. | Moisture Content of Cake |
|---|---|---|
| 55 (Control) | 55 | 78.9 |
| 70 | 55 | 75.6 |
| 85 | 55 | 64.4 |
| 100 | 55 | 55.4 |

EXAMPLE IV

Samples of zein cake obtained by spraying isopropyl alcohol extract of corn gluten into cold water were reslurried in water at elevated temperatures at a ratio of 1 part wet zein (80 per cent of moisture) to 4 parts of water. The temperature of the zein cake was 55° F. The resultant slurries after attaining the desired temperature were cooled to 72° F. and maintained at this temperature for one hour and then filtered, as in Example I. The results are shown in Table IV.

*Table IV*

| Temp. of Water Added to Cake, ° F. | Temp. of Slurry, ° F. | Temp. of Filtration, ° F. | Moisture of Cake |
|---|---|---|---|
| 55 (control) | 55 | 55 | 79.0 |
| 80 | 76 | 72 | 63.7 |
| 90 | 83 | 72 | 58.1 |
| 100 | 87 | 72 | 57.5 |
| 105 | 91 | 72 | 56.7 |
| 110 | 93 | 72 | 57.0 |

EXAMPLE V

A large scale run was performed, as described below. Operation was continuous. An isopropyl alcohol extract of corn gluten containing about 25 g. of zein per 100 ml. of extract was sprayed into cold water at about 55 to 60° F. to precipitate the zein. The zein was filtered on a vacuum filter and the cake containing 81.1 per cent of moisture dropped into hot water (115° F.) at the rate of 1 part of wet zein to 4 parts of water. The temperature of the resultant slurry was about 80°. The slurry was maintained at this temperature for about 15 to 20 minutes. Thereafter it was cooled to about 55 to 60° F. by the addition of cold water and filtered. The zein cake contained about 55 to 62 per cent of moisture.

EXAMPLE VI

Corn gluten was extracted at 16 per cent solids with 80 per cent isopropyl alcohol containing 5 per cent caustic (based on gluten) for 30 minutes at 158° F. The slurry was cooled to 77° F. and filtered. The extract containing 6 g. of zein per 100 ml. of solvent was neutralized to pH 5.0 with hydrochloric acid, deoiled with an equal volume of hexane and the zein precipitated therefrom by pouring the extract into 8 volumes of water at 50° F. and holding the resultant suspension for 2 hours. The suspension was then heated at 77 to 78° F. for one hour. Thereafter the suspension was cooled to 50° F. and the zein precipitated therefrom filtered and dried. The zein filter cake contained 50 per cent moisture.

Zein treated in accordance with my invention has substantially the same characteristics, i. e., salt point, viscosity, and solubility as zein obtained in the usual commercial manner. However, as will be apparent from the examples, the amount of moisture retained by the zein after filtration from an aqueous suspension may be reduced from about 80 per cent to about 50 per cent. This results in considerable saving in drying cost. The filtration time is unexpectedly and notably reduced also and this permits an increase in the capacity of the filter. The present invention also improves the flash drying operation in that the step of admixing some dry zein with zein filter cake to provide the proper consistency for drying may be omitted. Thus, the capacity of the drier may be increased.

I claim:
1. In a process of recovering zein wherein zein is precipitated from solution or dispersion by adding cold water thereto, thereby forming a suspension of precipitated zein, and thereafter recovering the zein, the improvement which comprises subjecting the suspension of precipitated zein to mild heat treatment at temperatures between about 70° F. and about 110° F. without denaturing the zein and cooling the suspension to a temperature within the range of about 32° F. to about 77° F.

2. In a process of recovering zein wherein zein is precipitated from solution or dispersion by adding cold water thereto, thereby forming a suspension of precipitated zein, and thereafter recovering the zein, the improvement which comprises subjecting said suspension to mild heat treatment while agitating the same at temperatures within the range of about 70° F. to about 110° F. without denaturing the same, and thereafter cooling said suspension to a temperature within the range of about 32° F. to about 77° F.

3. In the process of recovering zein from an alcoholic solution thereof by adding cold water thereto to precipitate the zein and thereafter separating the zein from the resultant suspension and drying the zein, the improvement which comprises separating the precipitated zein from said suspension, reslurrying the zein in cold water and subjecting the resultant slurry to a mild heat treatment at a temperature between about 70° F. and about 110° F., thereafter cooling the slurry to a temperature within the range of about 32° to 77° F. and thereafter separating the zein.

4. In the process of recovering zein from an alcoholic solution thereof by adding cold water thereto to precipitate the zein and thereafter separating the zein from the resultant suspension and drying the zein, the improvement which comprises separating the precipitated zein from said zein suspension, reslurrying the zein in water and maintaining the temperature of the resultant slurry at about 80° F. for about 15 to 20 minutes, thereafter cooling the slurry to about 55° to 60° F. and separating the zein.

5. Process according to claim 4 wherein the amount of water in which the zein is reslurried is at least about 25 parts for each part of zein.

References Cited in the file of this patent

UNITED STATES PATENTS

| Number | Name | Date |
|---|---|---|
| 1,884,015 | Lougavoy | Oct. 25, 1932 |

FOREIGN PATENTS

| Number | Country | Date |
|---|---|---|
| 536,024 | Great Britain | Apr. 30, 1941 |

OTHER REFERENCES

Swallon, Ind. and Eng. Chem., vol. 33, No. 3, pp. 394–398, March 1941.